United States Patent
Fujimori et al.

(10) Patent No.: US 10,173,403 B2
(45) Date of Patent: Jan. 8, 2019

(54) ARAMID RESIN FILM LAMINATE AND METHOD FOR PRODUCING THE SAME

(71) Applicants: DUPONT TEIJIN ADVANCED PAPERS (JAPAN), LTD., Chiyoda-ku, Tokyo (JP); Kawamura Sangyo Co., Ltd., Yokkaichi, Mie (JP)

(72) Inventors: Tatsushi Fujimori, Tokyo (JP); Shinji Naruse, Tokyo (JP); Chihiro Kondo, Tokyo (JP); Yoshihiko Kagetani, Mie (JP); Hisashi Katsumata, Mie (JP); Masashi Kato, Mie (JP)

(73) Assignees: DUPONT TEIJIN ADVANCED PAPERS (JAPAN), LTD., Tokyo (JP); KAWAMURA SANGYO CO., LTD., Mie (JP)

( * ) Notice: Subject to any disclaimer, the term of this patent is extended or adjusted under 35 U.S.C. 154(b) by 0 days.

(21) Appl. No.: 14/394,925

(22) PCT Filed: Apr. 16, 2013

(86) PCT No.: PCT/JP2013/061267
§ 371 (c)(1),
(2) Date: Oct. 16, 2014

(87) PCT Pub. No.: WO2013/157538
PCT Pub. Date: Oct. 24, 2013

(65) Prior Publication Data
US 2015/0111013 A1    Apr. 23, 2015

(30) Foreign Application Priority Data

Apr. 20, 2012  (JP) ................................ 2012-097000

(51) Int. Cl.
| | | |
|---|---|---|
| *B32B 27/34* | (2006.01) | |
| *B32B 27/16* | (2006.01) | |
| *D21H 13/26* | (2006.01) | |
| *H01B 3/30* | (2006.01) | |
| *H01B 7/29* | (2006.01) | |
| *H01B 7/295* | (2006.01) | |
| *B32B 27/12* | (2006.01) | |
| *B32B 27/28* | (2006.01) | |
| *B32B 27/36* | (2006.01) | |

(Continued)

(52) U.S. Cl.
CPC .............. *B32B 27/34* (2013.01); *B32B 27/08* (2013.01); *B32B 27/12* (2013.01); *B32B 27/16* (2013.01); *B32B 27/286* (2013.01); *B32B 27/36* (2013.01); *B32B 37/10* (2013.01); *B32B 37/182* (2013.01); *D21H 13/26* (2013.01); *H01B 3/305* (2013.01); *H01B 7/292* (2013.01); *H01B 7/295* (2013.01); *B32B 37/06* (2013.01); *B32B 38/0008* (2013.01); *B32B 2037/0092* (2013.01); *B32B 2250/02* (2013.01); *B32B 2250/24* (2013.01); *B32B 2262/0269* (2013.01); *B32B 2307/206* (2013.01); *B32B 2310/14* (2013.01); *B32B 2379/08* (2013.01); *B32B 2457/04* (2013.01); *D21H 27/30* (2013.01); *Y10T 428/24942* (2015.01); *Y10T 428/31544* (2015.04); *Y10T 428/31721* (2015.04); *Y10T 428/31725* (2015.04); *Y10T 428/31736* (2015.04)

(58) Field of Classification Search
CPC ............ D21H 27/30; B32B 2037/0092; B32B 2262/0269; B32B 2310/14; B32B 27/08; B32B 27/12; B32B 27/16; B32B 27/286; B32B 27/34; B32B 27/36; B32B 38/0008
USPC .................. 428/212, 220, 422, 474.4, 475.2
See application file for complete search history.

(56) References Cited

U.S. PATENT DOCUMENTS

| 7,713,892 B2 | 5/2010 | Kihara et al. |
|---|---|---|
| 8,709,193 B2 | 4/2014 | Tada et al. |

(Continued)

FOREIGN PATENT DOCUMENTS

| CN | 1694984 | 11/2005 |
|---|---|---|
| CN | 101670699 | 3/2010 |

(Continued)

OTHER PUBLICATIONS

English translation of the Written Opinion dated Jul. 30, 2013 in International (PCT) Application No. PCT/JP2013/061267.

(Continued)

*Primary Examiner* — Frank J Vineis
*Assistant Examiner* — Alicia J Sawdon
(74) *Attorney, Agent, or Firm* — Wenderoth, Lind & Ponack, L.L.P.

(57) ABSTRACT

Provided is an a aramid-resin film laminate comprising an aramid paper comprising an aramid fibrid and an aramid short fiber, and a resin film laminated on each other. The aramid-resin film laminate is obtained by conducting a plasma treatment on a surface of the aramid paper, the surface having a skin layer portion whose heat of fusion measured with a differential scanning calorimeter (DSC) is 25 cal/g or less, and bonding the aramid paper and the resin film to each other by heating, pressing, or heating under pressure, with the plasma treated surface of the aramid paper and a plasma treated surface of the resin film facing each other. This laminate is an aramid-resin film laminate in which the aramid paper and the resin film are laminated on each other without using any adhesive agent and without impairing characteristics of both the aramid paper and the resin film, and is excellent in heat resistance, electrical characteristics, chemical resistance, mechanical characteristics, and the like.

7 Claims, No Drawings

(51) Int. Cl.
*B32B 27/08* (2006.01)
*B32B 37/10* (2006.01)
*B32B 37/18* (2006.01)
*D21H 27/30* (2006.01)
*B32B 37/06* (2006.01)
*B32B 38/00* (2006.01)
*B32B 37/00* (2006.01)

(56) References Cited

U.S. PATENT DOCUMENTS

| | | | |
|---|---|---|---|
| 2004/0060655 A1* | 4/2004 | Kawka | B32B 5/14 |
| | | | 156/309.6 |
| 2004/0071952 A1 | 4/2004 | Anderson et al. | |
| 2004/0072000 A1 | 4/2004 | Kawka et al. | |
| 2006/0003659 A1 | 1/2006 | Kawka et al. | |
| 2006/0068670 A1 | 3/2006 | Anderson et al. | |
| 2008/0000599 A1 | 1/2008 | Yokura et al. | |
| 2008/0182098 A1* | 7/2008 | Nakanishi | B32B 27/10 |
| | | | 428/326 |
| 2009/0047858 A1 | 2/2009 | Kihara et al. | |
| 2010/0062206 A1 | 3/2010 | Tada et al. | |
| 2012/0128988 A1 | 5/2012 | Yokura et al. | |

FOREIGN PATENT DOCUMENTS

| | | | |
|---|---|---|---|
| JP | 2006-501088 | 1/2006 | |
| JP | 2006-321183 | 11/2006 | |
| JP | 2008-7875 | 1/2008 | |
| JP | 2008-514471 | 5/2008 | |
| JP | 2008-183868 | 8/2008 | |
| JP | 2009-138312 | 6/2009 | |
| JP | 4607826 | 10/2010 | |
| JP | WO 2010150669 A1 * | 12/2010 | B32B 5/26 |
| JP | 2011-004565 | 1/2011 | |
| JP | 4746999 | 5/2011 | |
| WO | 2010/150669 | 12/2010 | |

OTHER PUBLICATIONS

International Search Report dated Jul. 30, 2013 in International (PCT) Application No. PCT/JP2013/061267.

* cited by examiner

ARAMID RESIN FILM LAMINATE AND METHOD FOR PRODUCING THE SAME

TECHNICAL FIELD

The present invention relates to an aramid-resin film laminate excellent in heat resistance, electrical characteristics, chemical resistance, mechanical characteristics, and the like, and a method for producing the aramid-resin film laminate. In particular, the present invention relates to an aramid-resin film laminate useful as an insulating material for rotating machines, transformers, and electrical or electronic devices, and the like, and a method for producing the aramid-resin film laminate.

BACKGROUND ART

Conventionally, formed articles made of heat resistant polymers have been used in an electrical insulation field where heat resistance is required. Especially, formed articles using aromatic polyamides (hereinafter, referred to as aramids) are excellent industrial materials having heat resistance, chemical resistance, and flame retardancy attributable to the molecular structures of the aramids. In particular, a paper (product name: KOMEX (registered trademark)), made of a fibrid and a fiber of poly (meta-phenylene isophthalamide) has been widely used as an electrically insulating paper excellent in heat resistance.

Likewise, laminates in which any of the above-described formed articles and a sheet material having different material properties, such as a resin film, are laminated on each other have been used in the electrically insulating applications. The stacking of the sheet materials having different material properties in such a laminate makes it possible to make use of characteristics of both the sheet, materials as characteristics of the laminate.

Methods for producing such a laminate include a method in which the laminate is obtained by applying an adhesive agent based on urethane, acrylic, or the like onto a mating surface between a heat resistant sheet material and a resin film, and thus laminating the sheet material and the resin film on each other (for example, Patent Literature 1), a method in which a molten resin composition is applied onto a heat resistant sheet material by a method such as extrusion, and thus a sheet layer of the resin composition is formed (for example, Patent Literature 2), and the like.

However, the former method has such a problem that the insulating performance is affected by degradation of the adhesive agent in the applications where the laminate is exposed to a high-temperature atmosphere for a long period, because the heat resistance of the adhesive agent is inferior to those of the heat-resistant sheet material and the resin film. The latter method is free from this problem, because no adhesive agent is used. However, the latter method has such a problem that the laminate has lower mechanical strength than a laminate in which a highly drawn resin film is laminated, because the resin composition in a molten state is applied, i.e., because the resin composition takes a so-called undrawn or slightly drawn state.

CITATION LIST

Patent Literatures

Patent Literature 1: Japanese Patent No. 4746999
Patent Literature 2: Japanese Patent Application Publication No. 2006-321183

SUMMARY OF INVENTION

An object of the present invent ion is to provide an aramid-resin film laminate in which an aramid paper and a resin film are laminated on each other without using any adhesive agent and without impairing characteristics of both of the aramid paper and the resin film, and which is excellent in heat resistance, electrical characteristics, chemical resistance, mechanical characteristics, and the like, as well as a method for producing the aramid-resin film laminate.

To solve the above-described problems, the present inventors have conducted intensive study. As a result, the present inventors have found that the above-described problems can be solved, when a plasma treatment is conducted on a surface of an aramid paper comprising an aramid fibrid and an aramid short fiber, the surface having a skin layer portion whose heat of fusion measured with a differential scanning calorimeter (DSC) is 25 cal/g or less, and then the aramid paper and a resin film are heated, pressed, or heated under pressure, with the plasma treated surface of the aramid paper and a plasma treated surface of the resin film facing each other. This finding has led to the completion of the present invention.

Specifically, a first invention of the present application provides a method for producing an aramid-resin film laminate in which a resin film and an aramid paper comprising an aramid fibrid and an aramid short fiber are laminated on each other, the method comprising: conducting a plasma treatment on a surface of the aramid paper, the surface having a skin layer portion whose heat of fusion measured with a differential scanning calorimeter (DSC) is 25 cal/g or less; and bonding the aramid paper and the resin film to each other by heating, pressing, or heating under pressure, with the plasma treated surface of the aramid paper and a plasma treated surface of the resin film facing each other.

A second invention of the present application provides the aramid-resin film laminate according to the above-described first invention, wherein a skin layer porosity of the surface, of the aramid paper, subjected to the plasma surface treatment and bonded to the resin film is 5% or more higher than a skin layer porosity of a surface, of the aramid paper, not in contact with the resin film.

A third invention of the present application provides the aramid-resin film laminate according to the above-described first or second invention, wherein a heat of fusion of the skin layer portion in the surface, of the aramid paper, subjected to the plasma surface treatment and being in contact with the resin film is 1.0 cal/g or more lower than a heat of fusion of a skin layer portion in a surface, of the aramid paper, not in contact with the resin film.

A fourth invention of the present application provides the aramid-resin film laminate according to any one of according to the above-described first to third inventions, wherein the aramid paper subjected to the plasma surface treatment and the resin film subjected to the plasma surface treatment are laminated directly on each other without using any adhesive agent.

A fifth invention of the present application provides the aramid-resin film laminate according to any one of the above-described first to fourth inventions, wherein the resin film comprises any one selected from polyethylene terephthalate, polyethylene naphthalate, polyimide, polytetrafluoroethylene, and polyphenylene sulfide.

A sixth invention of the present application provides the aramid-resin film laminate according to any one of the above-described first to fifth inventions, wherein the aramid-resin film laminate has a thickness of 0.05 to 1.00 mm.

A seventh invention of the present application provides the aramid-resin film laminate according to any one of the above-described first to sixth inventions, wherein the aramid-resin film laminate has a triple-layer structure of aramid paper-resin film-aramid paper.

An eighth invention of the present application provides a method for producing an aramid-resin film laminate, the method comprising:
    calendering an aramid paper comprising an aramid fibrid and an aramid short fiber between two roils having a temperature difference of at least 20° C.; then
    conducting a plasma treatment on a surface of the aramid paper on a side brought into contact with the roll of the lower temperature; and
    heating, pressing, or heating under pressure the aramid paper and a resin film, with the plasma treated surface of the plasma treated aramid paper and a plasma treated surface of the resin film facing each other.

DESCRIPTION OF EMBODIMENTS

Hereinafter, the present invention will be described in detail.
[Aramid]
In the present invention, an aramid means a linear polymeric compound in which 60% or more of amide linkages are directly bonded to aromatic rings. Examples of such an aramid include poly(meta-phenylene isophthalamide), copolymers thereof, poly(para-phenylene terephthalamide), copolymers thereof, copoly(para-phenylene-3,4'-diphenyl ether terephthalamide), and the like. These aramids are industrially produced, for example, based on a condensation reaction between an aromatic acid dichloride and an aromatic diamine(s) by a solution polymerisation method, a two-step interfacial polymerization method, or the like, and are available as commercial products. However, the aramids are not limited thereto. Of these aramids, poly(meta-phenylene isophthalamide) is preferably used, because it has excellent characteristics such as formability, flame retardancy, and heat resistance.
[Aramid Fibrid]
In the present invention, an aramid fibrid is film-like fine particles made of an aramid, and may also be referred to as an aramid pulp. Examples of methods for producing an aramid fibrid include those described in Japanese Examined Patent Application Publications Hos. Sho 35-11851 and Sho 37-5732, and the like. The fibrid have a property of being formed into paper as in the case of ordinary wood (cellulose) pulp. Hence, after the fibrid is dispersed in water, the fibrid can be formed into a sheet-like shape with a paper machine. In this case, a so-called beating/refining treatment can be conducted in order to keep qualities suitable for paper making. This beating/refining treatment can be conducted with a disk refiner, a beater, or other devices having a mechanical cutting effect for treating paper-making raw materials. In this operation, the change in the form of the fibrid can be monitored based on the freeness specified in JIS P 8121. In the present invention, the freeness of the fibrid of the organic compound subjected to the beating/refining treatment is preferably in a range from 10 to 300 $cm^3$ (Canadian standard freeness). A fibrid having a freeness above this range may lead to a decrease in strength of the nonwoven fabric sheet formed from the fibrid. On the other hand, when an attempt is made to obtain a freeness below 10 $cm^3$, the efficiency of utilization of the inputted mechanical power is lowered, and the amount of treatment per unit time decreases in many cases. Moreover, the fibrid becomes excessively fine, so that the so-called binder function tends to decrease. Hence, no significant advantage is seen by obtaining a freeness smaller than 10 $cm^3$.
[Aramid Short Fiber]
In the present invention, an aramid short fiber is one obtained by cutting a fiber made of an aramid into pieces having predetermined lengths. Examples of such a fiber include "CONEX (registered trademark)" and "TECHNORA (registered trademark)" of Teijin Techno Products Limited, "NOMEX (registered trademark)" and "KEVLAR (registered trademark)" of DuPont, "TWARON (registered trademark)" of Teijin Aramid BV, and the like, but are not limited thereto.

The aramid short fiber can preferably have a fineness in a range from 0.05 dtex inclusive to 25 dtex exclusive. A fiber having a fineness of less than 0.05 dtex is not preferable, because aggregation tends to occur during the production by a wet method (described later). Meanwhile, a fiber having a fineness of 25 dtex or more is not preferable, because of the following reason. Specifically, such a fiber has an excessively large fiber diameter. Hence, decrease in aspect ratio, reduction of the mechanical reinforcing effect, and poor uniformity of the aramid paper may occur, for example, in a case where an aramid short fiber having a completely circular shape and a density of 1.4 $g/cm^3$ has a diameter of 45 microns or larger.

The length of the aramid short fiber can be selected in a range from 1 mm inclusive to 25 mm exclusive. If the length of the short fiber is less than 1 mm, mechanical characteristics of the aramid paper deteriorate. On the other hand, an aramid short fiber having a length of 25 mm or more tends to undergo "entanglement", "bundling", and the like during production of the aramid paper by a wet method described later, and hence tends to cause defects. Therefore, either case is not preferable.
[Aramid Paper]
In the present invention, an aramid paper is a sheet-dike article mainly made of the above-described aramid fibrid and aramid short fiber, and has a thickness in a range from 20 μm to 1000 μm, in general. In addition, the aramid paper has a mass per unit area in a range from 10 $g/m^2$ to 1000 $g/m^2$, in general.

The aramid paper is generally produced by a method in which the above-described aramid fibrid and aramid short fiber are mixed with each other at a weight ratio of, for example, 5/95 to 95/5, and preferably 10/90 to 90/10, and then a sheet is formed therefrom. Specific examples of employable methods include a method in which the aramid fibrid and the aramid short fiber are dry blended with each other, and then a sheet is formed by using air stream; a method in which the aramid fibrid and the aramid short fiber are dispersed in a liquid medium and mixed with each other, then a sheet is formed by discharging the dispersion onto a liquid permeable support such as a screen or a belt, and the liquid is removed from the sheet, which is then dried; and the like. Of these methods, the so-called, wet paper making method is preferably selected in which water is used as the medium.

In the wet paper making method, aqueous slurries of at least the aramid fibrid and the aramid short fiber or an aqueous slurry of a mixture thereof is fed to a paper machine and dispersed, followed by water-draining, water-squeezing, and drying, and then the paper is wound as a sheet, in general. As the paper machine, a Fourdrinier paper machine, a cylinder paper machine, an inclined-type paper machine, a combination paper machine in which any of these paper machines are combined, or the like is used. In the case of production using a combination paper machine, it is possible to obtain a composite sheet comprising multiple paper layers by forming sheets from slurries having different mixing ratios and integrating these sheets together. If necessary, additives such as a dispersibility improver, a defoamer, and a strengthening agent are used in the paper making.

[Calendering]

The density and mechanical strength of the aramid paper obtained as described above can be improved by hot-pressing the aramid paper between a pair of rolls at high temperature and high pressure. When metal rolls are used, the hot-pressing conditions are, for example, that the temperature is 10° C. to 350° C. and the linear pressure is 50 kg/cm to 400 kg/cm, but are not limited thereto. It is also possible to laminate multiple aramid papers during the hot-pressing. The above-described hot-pressing may be conducted multiple times in any order.

It seems that the porous nature of the paper decreases, and the surface is smoothed by calendering the aramid paper by the above-described method, so that the adhesion to the resin film described later decreases. It is important to increase the interlayer adhesion between the aramid paper and the resin film for avoidance of peeling during the use of the aramid-resin film laminate. In the present invention, a plasma surface treatment to be described later is conducted to improve the interlayer adhesion. With the intention of further increasing this effect, the present inventors have found the following fact. Specifically, when the porosities of skin layers of the aramid paper are different from each other by 5% or more, and the surface on the side with the higher porosity is subjected to a plasma surface treatment, and laminated onto the resin film, a high adhesion can be obtained without impairing characteristics, such as mechanical strength, of the aramid paper. In the present invention, a skin layer refers to a portion extending 10 μm from the topmost surface in the sectional direction. Here, the maximum difference between the porosities is preferably 70%.

Examples of methods for obtaining an aramid paper in which the difference between the porosities of the two skin layers is 5% or more include a method in which calendering is conducted once with rolls heated to different temperatures; a method in which an aramid paper is calendered with a surface thereof at a certain temperature, and then the aramid paper is calendered with the surface on the opposite side at a different temperature; and the like, but the methods are not limited thereto. By such calendering, the porous nature, i.e., the porosities of the skin layers of the aramid paper can be varied. Moreover, by conducting a plasma surface treatment to be described later on the surface brought into contact with the roll of the lower temperature, i.e., the more porous surface, if is possible to obtain an increased effect of the plasma surface treatment during the lamination. It seems that this increased effect, together with an anchor effect, consequently improves the interlayer adhesion between the aramid paper and the resin film. In the present invention, when the calendering is conducted with two calender rolls at different temperatures, the temperature difference is at least 20° C., preferably 50° C., and more preferably 100° C. Here, a maximum temperature difference is preferably 340° C. In addition, the temperature of the calender roll of the lower temperature is preferably in a range from 10 to 330° C.

[Heat of Fusion]

In the present invention, the heat of fusion is measured by a thermal method such as DSC (Differential Scanning Calorimetry) or DTA (Differential Thermal Analysis). In general, a polymer exhibits a broad melting behavior in reflection of the inclusion of components having non-uniform molecular weights, the difference in degree of crystallization, and the like. In the present invention, the area of the endothermic peak portion in a DSC analysis is employed as the heat of fusion.

The heat of fusion per unit solid content in a skin layer of the above-described calendered aramid paper can be considered to represent the amount of crystals. The aramid-resin film laminate of the present invention is characterized in that the heat of fusion of the skin layer portion in the surface, of the aramid paper, laminated on the resin film is 25 cal/g or less, and the adhesion between the aramid paper and the resin film is enhanced by laminating the surface with the low degree of crystallization onto the resin film. However, an aramid paper with a low degree of crystallization has generally a low mechanical strength. Hence, to obtain an aramid paper having a surface with a low degree of crystallization and a high mechanical strength, the calendering using two calender rolls having a temperature difference or the lite is conducted. Then, the surface with the lower degree of crystallization is subjected to a plasma surface treatment, and then laminated onto the resin film. Presumably, in this manner, the adhesion between the aramid paper and the resin film can be further enhanced, and characteristics such as mechanical strength can also be improved. A preferred range of the heat of fusion of the skin layer portion in the surface laminated onto the resin film is 10 to 25 cal/g.

The heat of fusion of the skin layer portion, of the aramid paper, in the surface in contact with the resin film is preferably lower than the heat of fusion of the skin layer portion in the surface not in contact with the resin film by 1.0 cal/g or more, more preferably by 1.2 cal/g or more, and further preferably by 1.5 cal/g or more. Here, a preferred maximum difference is 20 cal/g.

[Resin Film]

In the present invention, the resin film is a synthetic resin formed into a sheet-like shape by a method in which the synthetic resin is melted and then formed into the sheet-like shape, a method in which the synthetic resin is formed into the sheet-like shape by removing a solvent from a solution of the synthetic resin, or the like. After the synthetic resin is formed into the sheet-like shape, the synthetic resin may be drawn, or may be left undrawn, A drawn resin film is preferable in terms of high mechanical strength. An undrawn resin film has characteristics such as excellent formability. The resin film has a thickness of 2 to 500 μm, preferably 5 to 400 μm, and further preferably 10 to 300 μm.

In the present invention, any synthetic resin film can be used without limitation. In particular, the synthetic resin is preferably polyethylene terephthalate, polyethylene naphthalate, polyamide, polytetrafluoroethylene, or polyphenylene sulfide. A film of any one of these synthetic resins can be laminated on the aramid paper by a method to be described later without using any adhesive agent to form the aramid-resin film laminate, which can be used suitably as a material for electrically insulating members and the like without impairing characteristics of the film of the synthetic resin.

[Plasma Surface Treatment]

In the present invention, the plasma surface treatment refers to a treatment which is conducted by exposing a substrate to an electric discharge started and continued by applying a direct or alternating high voltage between electrodes, such as corona discharge under atmospheric pressure or glow discharge under vacuum. Here, a treatment under vacuum is preferable, because a wide variety of treatment gases can be selected, although the treatment is not particularly limited thereto. The treatment gas is not particularly limited, and one of or a mixture of He, Ne, Ar, nitrogen, oxygen, carbon dioxide gas, air, steam, and the like is used. Of these gases, Ar and carbon dioxide gas are preferable in terms of discharge-starting efficiency. The treating pressure is not particularly limited, and a glow discharge treatment in which the electric discharge is conducted continuously in a pressure range from 0.1 Pa to 1330 Pa, i.e., the so-called low-temperature plasma treatment, is preferable in terms of treatment efficiency. The treating pressure is further preferably in a range from 1 Pa to 266 Pa.

More specifically, desired excellent thermal welding characteristics can be obtained, when the composition ratio X (O/C) of oxygen atoms (O) to carbon atoms (C) on the aramid paper-surface in the present invention is in a range from 120% to 250%, both inclusive, of the theoretical value. Here, the composition ratio X (O/C) refers to the ratio between the number of carbon atoms (C) and the number of oxygen atoms (O) (measured values) obtained by measuring the surface of the aramid paper by XPS (X-ray photoelectron spectroscopy). In addition, the theoretical value of the ratio refers to a value of the ratio of the numbers of atoms calculated on the basis of the repeating unit in the chemical structural formula of the polymer in the resin composition constituting the resin.

For example, in the case of NOMEX (registered trademark) paper, the ratio C/O/N equals to 14/2/2 in poly(mets-phenylene isophthalamide), which is the main component. The theoretical value of the composition ratio X (O/C) of the number of carbon atoms (C) to the number of oxygen atoms (O), which is determined base on the carbon (C), is 2/14=0.143. In general, since a trace amount of hydrocarbons are attached to the surface, an actual measurement value is said to be smaller than the theoretical value.

In a study conducted by the present inventors, good thermal welding characteristics were successfully obtained, when the composition, ratio X (O/C) was in the range from 120% to 250%, both inclusive, of the theoretical value, i.e., when the composition ratio X (O/C) was larger than the theoretical value by a range from 20% to 150%. The composition ratio X (O/C) is more preferably in a range from 150% to 230%, both inclusive. If the composition ratio X is less than 120% of the theoretical value, good thermal welding characteristics cannot be obtained. Meanwhile, if the composition ratio X exceeds 250% of the theoretical value, good thermal welding characteristics cannot be obtained, either.

In addition, as a method for obtaining an aramid paper having a composition ratio X (O/C) within the above-described range, a method can be employed in which a low-temperature plasma treatment is conducted on the surface of an aramid paper obtained by the above-described method with a low-temperature plasma treatment apparatus. Thus, an aramid paper excellent in thermal welding characteristics can be obtained.

Here, when the low-temperature plasma treatment is conducted on the aramid paper by employing an inner electrode type plasma treatment apparatus, the treatment intensity (output) of the low-temperature plasma treatment is preferably in a range from 30 W·min/m$^2$ to 1500 W·min/m$^2$. Thus, the above-described composition ratio X (O/C) in the aramid paper surface can be obtained within the above-described range. A study conducted by the present inventors has shown the following fact. Specifically, if the intensity of the low-temperature plasma treatment was below the above-describe range, the above-described composition ratio X was small. Meanwhile, if the intensity of the low-temperature plasma treatment is above the above-describe range, the above-described composition ratio X is large. In either case, good thermal welding characteristics cannot be obtained. More preferably, the treatment intensity (output) is in a range from 130 W·min/m$^2$ to 1200 W·min/m$^2$.

In addition, in the present invention, to further enhance the adhesion between the aramid paper and the resin film, it is necessary to conduct a plasma surface treatment also on a surface of the resin film. The above-described low-temperature plasma treatment is particularly preferable in terms of treatment efficiency. In the low-temperature plasma treatment, the treatment intensity (output) can be selected, as appropriate, depending on the type of the resin film and the type and performance of the treatment apparatus used for the treatment. Note that the apparatus, electrodes, treatment gas, and the like for the low-temperature plasma treatment are not particularly limited, and known ones can be used.

[Aramid-Resin Film Laminate]

In the present invention, an aramid-resin film laminate has a layered structure including at least two layers or more in which the aramid paper subjected to the above-described plasma surface treatment and the resin film subjected to the above-described plasma surface treatment are laminated on each other. In general, the aramid-resin film laminate preferably has a thickness of 0.05 mm to 1.00 mm. The thickness is more preferably 0.08 mm to 0.90 mm, and further preferably 0.10 mm to 0.85 mm.

For the aramid-resin film laminate of the present invention, any layer structure may be employed within the above-described thickness range. In particular, a triple-layer structure of aramid paper-resin film-aramid paper in which sheets of the aramid paper are arranged on the surfaces is preferable in terms of the uniformity in the thickness direction, the dimensional stability, ease of utilization of the high heat resistance of the aramid paper, and the like.

In the present invention, methods for forming the aramid-resin film, laminate include heating, pressing, heating under pressure, and the like. Examples of the methods include a method based on hot pressing, a method of passing between a pair of heated rolls, a method using hot air, joining by ultrasonic, and the like, but are not limited thereto. Here, it is desirable not to raise the temperature for forming the laminate to a temperature near the melting point or the decomposition temperature, but to set the temperature lower than these temperatures, in terras of mechanical characteristics and insulating characteristics of the laminate, and the like. In the aramid-resin film laminate of the present invention, the surfaces of the aramid paper and the resin film are subjected to the plasma treatment. Hence, it is possible to obtain good inter layer adhesion, without raising the laminating temperature to a temperature near the melting point or the decomposition temperature. Thus, the aramid-resin film laminate can be formed without impairing mechanical characteristics of the resin film. The temperature at which the aramid-resin film laminate is formed is not particularly limited, as long as the temperature is sufficiently lower than the melting point, the softening point, or the decomposition temperature of the resin film to be laminated. A temperature at which mechanical characteristics of the resin film can be sufficiently maintained may be selected according to the resin film to be laminated considering the melting point, the softening point, or the decomposition temperature of the resin film.

EXAMPLES

Hereinafter, the present invention will be described more specifically on the basis of Examples. Note that these Examples are for illustration purposes only, and do not limit contents of the present invention at all.

[Measuring Method]

(1) Mass per Unit Area, Thickness, and Density

Measurements were conducted according to JIS C 2300-2, and the density was calculated by (mass per unit area/thickness).

(2) Skin Layer Porosity

Cross-sectional photographs of each sheet were taken at five randomly selected points by using a scanning electron microscope. For each of all the five points, the area of pore portions in a portion extending 10 μm from the topmost surface in the depth direction was determined, and the skin layer porosity was calculated by the following formula. The average value of the skin layer porosities at the five points was employed as the skin layer porosity.

(Skin layer porosity) [%]=(area of pore portions)/
(area of portion extending 10 μm from topmost
surface)×100

(3) Heat of Fusion of Skin Layer

Samples for measurement were taken from the skin layer portions of each sheet and measured by a DSC analysis in a nitrogen atmosphere at a rate of temperature rise of 10° C./minute. Five samples per surface were measured, and the average value thereof was employed as the heat of fusion.

(4) Interlayer Adhesion

According to JIS C 6481, the peeling force at an angle of 90 degrees of each sample having a width of 10 mm was measured by using a tensile tester at a tensile speed of 50 mm/minute.

(5) Bending Processability

Each sample cut into a size of 11 mm in width and 30 cm in length was inserted into an automatic bending machine (produced by our company), and subjected to a bending process. Then, the bending processability was evaluated. For the evaluation, the presence or absence of changes in appearance such as "lifting" and "peeling" in the bent portion was visually observed. Evaluation criteria were as follows: a sample which was free from "lifting," "peeling," and the like and which was at a practical level was evaluated as good (o), and a sample in which "lifting" or "peeling" occurred in any part and which was unsuitable for a commercial product was evaluated as poor

[Preparation of Raw Materials]

A fibrid of poly(meta-phenylene isophthalamide) was produced by using a pulp particle production machine (wet sedimentation machine) including a combination of a stator and a rotor and described in Japanese Patent Application Publication Ho. Sho 52-15621. This fibrid was treated in a disintegrator and a beater/refiner to prepare a fibrid having a length-weighted mean fiber length of 0.9 mm. On the other hand, a meta-aramid fiber (NOMEX (registered trademark), single yarn fineness: 2.2 dtex) manufactured by DuPont was cut into pieces having a length of 6 mm to prepare a raw material for paper making.

[Production of Calendered Aramid Papers]

Slurries were prepared by dispersing the aramid fibrid and aramid short fiber prepared as described above in water, respectively. These slurries were mixed with each other to achieve a mixing ratio (weight ratio) of the aramid fibrid to the aramid short fiber of 1/1. The mixture was then fed to a Fourdrinier paper machine, and subjected to water-draining, water-squeezing, drying, and winding. Thus, an aramid paper was obtained. Subsequently, this aramid paper was heated under pressure using metal calender rolls at a linear pressure of 150 kg/cm, while the temperature of one of the rolls was set to 330° C., and the temperature of the other was set to 200° C. Thus, a calendered aramid paper A was obtained.

In addition, the above-described aramid paper was heated under pressure by using metal calender rolls at a temperature of 330° C. and at a linear pressure of 150 kg/cm. Thus, a calendered aramid paper B was obtained.

[Production of Aramid Papers subjected to Plasma Surface Treatment]

Each of the above-described calendered aramid papers A and B was passed through an inner electrode type low-temperature plasma treatment apparatus described in Japanese Patent No. 4607826, and was subjected to a low-temperature plasma treatment at a treatment intensity of 650 W·min/m/d Here, regarding the calendered aramid paper A, the low-temperature plasma treatment was conducted on only the surface brought into contact with the roll of the lower temperature, and thus an aramid paper C subjected to the plasma surface treatment was obtained. Meanwhile, regarding the calendered aramid paper B, the low-temperature plasma treatment was conducted on only one randomly selected surface, and thus an aramid paper D subjected to the plasma surface treatment was obtained. Here, the composition ratio X (G/C) of the number of oxygen atoms (O) to the number of carbon atoms (C) in the plasma-treated surface of each of the aramid papers C and D was 206% of the theoretical value of the ratio of the numbers of the atoms.

[Production of Resin Film subjected to Plasma Surface Treatment]

A polyphenylene sulfide resin (hereinafter, referred to as PPS) film (referred to as FPS film E) having a thickness of 100 μm was passed through the inner electrode type low-temperature plasma treatment apparatus described in Japanese Patent Ho. 4607826, and a low-temperature plasma treatment was conducted on both surfaces of the film at a treatment intensity of 100 W·in/m$^2$. Thus, a PPS film F subjected to the plasma surface treatment was obtained.

Example 1

Two sheets of the above-described aramid paper C subjected to the plasma surface treatment and a sheet of the PPS film F subjected to the plasma surface treatment were laminated together to form a triple-layer structure of aramid paper-resin film-aramid paper, with the plasma-treated surfaces being laminated on each other. Then, this stack was heated under pressure using metal calender rolls at a temperature of 180° and at a linear pressure of 500 kg/cm. Thus, an aramid paper-PPS film laminate was obtained. Here, the skin layer porosity of the aramid paper was 62% in the surface in contact with the resin film, and 48% in the surface not in contact with the resin film. Meanwhile, the heat of fusion of the skin layer of the aramid paper was 21.8 cal/g in the surface in contact with the resin film, and 27.6 cal/g in the surface not in contact with the resin film. Table 1 shows values of major characteristics of the thus obtained aramid paper-PPS film laminate.

Comparative Example 1

An aramid paper-PPS film laminate was obtained in the same manner as in Example 1, except that the aramid paper A not subjected to a plasma surface treatment was used instead of the aramid paper c, and the resin film E not subjected to a plasma surface treatment was used instead of the resin film F. Here, the skin layer porosity of the aramid paper was 59% in the surface in contact with the resin film, and 49% in the surface not in contact with the resin film. In addition, the heat of fusion of the skin layer of the aramid paper was 22.8 cal/g in the surface in contact with the resin film, and 28.4 cal/g in the surface not in contact with the resin film. Table 1 shows values of major characteristics of the thus obtained aramid paper-PPS film laminate.

Comparative Example 2

An aramid paper-PPS film laminate was obtained in the same manner as in Example 1, except that the aramid paper B not subjected to a plasma surface treatment was used instead of the aramid paper C, and the resin film E not subjected to a plasma surface treatment was used instead of the resin film F, Here, the skin layer porosity of the aramid paper was 49% in the surface in contact with the resin film, and 48% in the surface not in contact with the resin film. In addition, the heat of fusion of the skin layer of the aramid paper was 26.8 cal/g in the surface in contact with the resin film, and 27.2 cal/g in the surface not in contact with the resin film. Table 1 shows values of major characteristics of the thus obtained aramid paper-PPS film laminate.

Comparative Example 3

An aramid paper-PPS film laminate was obtained in the same manner as in Example 1, except that the aramid paper D subjected to the plasma treatment was used instead of the aramid paper C, Here, the skin layer porosity of the aramid paper was 50% in the surface in contact with the resin film, and 48% in the surface not in contact with the resin film. In addition, the heat of fusion of the skin layer of the aramid paper was 27.9 cal/g in the surface in contact with the resin film, and 28.2 cal/g in the surface not in contact with the resin film. Table 1 shows values of major characteristics of the thus obtained aramid paper-PPS film laminate.

TABLE 1

| Characteristics | Unit | Ex. 1 | Comp. Ex. 1 | Comp. Ex. 2 | Comp. Ex. 3 |
|---|---|---|---|---|---|
| Aramid paper | | C | B | B | D |
| mass per unit area | g/m² | 40.0 | 40.0 | 40.0 | 40.0 |
| thickness | mm | 0.068 | 0.068 | 0.059 | 0.059 |
| density | g/cm³ | 0.59 | 0.59 | 0.68 | 0.68 |
| Resin Film | | F | E | E | F |
| mass per unit area | g/m² | 135 | 135 | 135 | 135 |
| thickness | μm | 100 | 100 | 100 | 100 |
| density | g/cm³ | 1.35 | 1.35 | 1.35 | 1.35 |
| Aramid-resin film laminate | | | | | |
| mass per unit area | g/m² | 215 | 215 | 215 | 215 |
| thickness | μm | 0.200 | 0.200 | 0.195 | 0.195 |
| density | g/cm³ | 1.08 | 1.08 | 1.10 | 1.10 |
| interlayer adhesion | N/cm | 1.6 | 0.1 | 0.1 | 0.5 |
| bending processability (appearance) | | ○ | x | x | x |

As shown in Table 1, Example 1, which is a product of the present invention and in which the aramid paper was laminated after the plasma surface treatment was conducted on the surface of having a heat of fusion of 25 cal/g or less, achieved a high interlayer adhesion in the resultant aramid-resin film laminate, and also exhibited excellent characteristics in terms of bending processability. In contrast, each of Comparative Examples 1 and 2 achieved a low interlayer adhesion between the aramid paper and the resin film, and easily underwent "lifting" or "peeling" in the bending processability test. Meanwhile, Comparative Example 3 achieved a better adhesion than Comparative Examples 1 and 2, but the bending processability was not sufficiently satisfactory. It has been suggested that Comparative Example 3 is insufficient as an insulating material, because the interlayer peeling may occur, for example, when Comparative Example 3 is wound around a conductor or the like. Accordingly, it has been demonstrated that the use of the aramid-resin film laminate shown in Example above is effective for obtaining an aramid-resin film laminate which is excellent in heat resistance, electrical characteristics, mechanical characteristics, and the like and is useful as an insulating material for rotating machines, transformers, and electrical or electronic devices.

What is claimed is:

1. An aramid-resin film laminate comprising:
   an aramid paper comprising an aramid fibrid and an aramid short fiber; and
   a resin film selected from the group consisting of polyimide film and polyphenylene sulfide film, the resin film and the aramid paper being laminated on each other, wherein
   the aramid-resin film laminate is obtained by
      conducting a plasma treatment on a surface of the aramid paper, the plasma treated surface having a skin layer portion whose heat of fusion measured with a differential scanning calorimeter (DSC) is 10 cal/g to 25 cal/g, and
      bonding the aramid paper and the resin film to each other by heating, pressing, or heating under pressure, with the plasma treated surface of the aramid paper and a plasma treated surface of the resin film facing each other.

2. The aramid-resin film laminate according to claim 1, wherein a skin layer porosity of the surface, of the aramid paper, subjected to the plasma surface treatment and bonded to the resin film is 5% or more higher than a skin layer porosity of a surface, of the aramid paper, not in contact with the resin film.

3. The aramid-resin film laminate according to claim 1, wherein a heat of fusion of the skin layer portion in the surface, of the aramid paper, subjected to the plasma surface treatment and being in contact with the resin film is 1.0 cal/g or more lower than a heat of fusion of a skin layer portion in a surface, of the aramid paper, not in contact with the resin film.

4. The aramid-resin film laminate according to claim 1, wherein the aramid paper subjected to the plasma surface treatment and the resin film subjected to the plasma surface treatment are laminated directly on each other without using any adhesive agent.

5. The aramid-resin film laminate according to claim 1, wherein the aramid-resin film laminate has a thickness of 0.05 to 1.00 mm.

6. The aramid-resin film laminate according to claim 1, wherein the aramid-resin film laminate has a triple-layer structure of aramid paper-resin film-aramid paper.

7. A method for producing the aramid-resin film laminate of claim 1, comprising:
   calendering an aramid paper comprising an aramid fibrid and an aramid short fiber between two rolls having a temperature difference of at least 20° C.; then conducting a plasma treatment on a surface of the aramid paper on a side brought into contact with the roll of the lower temperature; and heating, pressing, or heating under pressure the aramid paper and a resin film, with the plasma treated surface of the plasma treated aramid paper and a plasma treated surface of the resin film facing each other.

* * * * *